United States Patent [19]

Cunningham et al.

[11] Patent Number: 4,703,412
[45] Date of Patent: Oct. 27, 1987

[54] PORTABLE CONTROL UNIT FOR THEATER, TELEVISION, AND FILM LIGHTING CONTROL SYSTEMS

[75] Inventors: David W. Cunningham, Los Angeles; Gregory F. Esakoff, Huntington Harbor, both of Calif.

[73] Assignee: Lee Colortran, Inc., Burbank, Calif.

[21] Appl. No.: 775,795

[22] Filed: Sep. 13, 1985

[51] Int. Cl.$^4$ .............................................. G06F 3/00
[52] U.S. Cl. .................................. 364/140; 364/188; 364/191
[58] Field of Search ............... 364/140, 141, 146, 147, 364/171, 188, 189, 191, 192; 315/292, 316, 360, 361; 178/18, 19

[56] References Cited

U.S. PATENT DOCUMENTS

| | | | |
|---|---|---|---|
| 3,873,769 | 3/1975 | Cotter | 178/18 |
| 4,158,132 | 6/1979 | O'Dell | 315/292 |
| 4,358,715 | 11/1982 | Dinges | 315/292 |
| 4,429,364 | 1/1984 | Marayama | 364/191 |
| 4,437,169 | 3/1984 | Bertenshaw | 315/292 |
| 4,446,520 | 5/1984 | Shigeta | 364/192 |
| 4,488,000 | 12/1984 | Glenn | 178/18 |
| 4,511,824 | 4/1985 | Goddard | 315/292 |
| 4,551,810 | 11/1985 | Levine | 364/191 |
| 4,564,928 | 1/1986 | Glenn et al. | 178/18 |
| 4,608,642 | 8/1986 | Shima | 364/191 |

FOREIGN PATENT DOCUMENTS 140647 8/1985 European Pat. Off. ............ 364/188

OTHER PUBLICATIONS

SITRALUX B30, A Lighting Control System for Stages and TV Studioser et al; Müller et al; Siemens Review XLV (1978), No. 9; pp. 423-426.

Primary Examiner—Jerry Smith
Assistant Examiner—Allen MacDonald
Attorney, Agent, or Firm—Christie, Parker & Hale

[57] ABSTRACT

A self-contained portable unit for use with theater and television dimming systems and, in particular, with one control console of a microprocessor-based lighting control system having a data display device such as a CRT. The unit includes a digitizer tablet, a stylus and an overlay to be placed on the tablet. The keyboard of the console is reproduced in the overlay in the form of keys replicating indicia printed or silk-screened on the overlay. An area is also provided on the overlay for placement of the designer's lighting pattern layout. Lighting pattern information and lighting levels are entered into the system by the unit by touching the stylus to specific points in the layout and to specific key indicia selected by the user. Initially, each symbol on the lighting pattern layout is defined by using the unit or the console to enter the channel, the light level in each channel, cueing instructions, or other information which the symbol represents into the system. Thereafter, by touching the stylus to the symbol when it is in position on the overlay, the complete line or list of information represented by the symbol is immediately displayed on the CRT screen without the necessity of rekeying all the symbol definitional information into the system.

8 Claims, 7 Drawing Figures

Fig. 5.

| | | | |
|---|---|---|---|
| 1 | 2BBL5, 2BBR 1 | A | 825 |
| 2 | 2BBL 6, 2BBR 2 | a | 855 |
| 3 | 2BBL 3, 2BBR 3 | B | 825 |
| 4 | 2BBL 4, 2BBR 4 | b | 855 |
| 5 | 2BBL5, 2BBR 1 | C | 825 |
| 6 | 2BBL 6, 2BBR 2 | c | 855 |
| 7 | 1BBL 1,2 | WWL | 826 |
| 8 | 1BBR 1,2 | WWR | 826 |
| 9 | 1BBL 3,4 | CWL | 851 |
| 10 | 1BBR 3,4 | CWR | 851 |
| 11 | BR 1,3,5 | NW | 830 |
| 12 | BR 2,4,6 | CW | 848 |
| 13 | 1P 1,8 | A | 825 |
| 14 | 1P 3,10 | B | 825 |
| 15 | 1P 5,12 | C | 825 |
| 16 | 1P 2,7 | D | 825 |
| 17 | 1P 4,9 | E | 825 |
| 18 | 1P 6,11 | F | 825 |
| 19 | 2P 2 & 15 | G | 825 |
| 20 | 2P 3 & 16 | G | 825 |
| 21 | 1BBL 1,3 | WS/L | NC |
| 22 | 1BBR 1,3 | WS/L | NC |
| 23 | 1BBL 2,4 | CS/L | 851 |
| 24 | 1BBR 2,4 | CS/L | 851 |
| 25 | 3P 1 | AB/L | 803 |
| 26 | 3P 2 | BB/L | 803 |
| 27 | 3P 3 | CB/L | 803 |
| 28 | 4P 1 | DB/L | 803 |
| 29 | 4P 2 | EB/L | 803 |
| 30 | 4P 3 | FB/L | 803 |
| 31 | 5P 9 | GB/L | 803 |
| 32 | 5P 10 | GB/L | 803 |

4,703,412

PORTABLE CONTROL UNIT FOR THEATER, TELEVISION, AND FILM LIGHTING CONTROL SYSTEMS

BACKGROUND OF THE INVENTION

1. Field of the Invention

The present invention relates to lighting control systems and, in particular, to a self-contained portable unit which duplicates all of the keyboard functions of a microprocessor-controlled lighting control console and provides rapid recall of information stored in the system.

2. The Prior Art

The present invention relates to lighting control systems for controlling the lighting in theaters, TV studios, and film sound stages. In any of the above instances, an important element of the overall set-up is the provision of lighting fixtures and the design of the lighting pattern to provide proper illumination of the stage or of sub-areas on the stage for each scene and each interval of each scene throughout the course of a production.

To this end, lighting fixture supports of various types are placed above and to the right and left sides of the stage, in footlights along the front of the stage, and may also be placed at different locations in the theater. To these supports, spotlights, dimmers and various other types of lights are mounted on movable mountings and physically oriented so as to direct their illumination to a preselected spot or area.

As indicated, an important aspect of the overall artistic impression created by the production is the design of the lighting patterns and the lighting effects to be utilized in each scene as specified by the lighting director. A lighting director is one of the artists who are employed as part of the organization connected with the production. The lighting director, along with the producer, the director, the costume designer, the music director, the choreographer, and the set designer, form the cadre of artists whose efforts are all integrated into what results in the final production.

In approaching an assignment to design the lighting for a particular production, the lighting control director or designer first works out a lighting control plan for the entire production. This plan is normally worked out on paper, utilizing whatever symbols and notations are preferred by the lighting director. Depending upon his preferences, this plan can take a number of different forms. In some cases, the layout or plan is a drawing in which placement of the various elements corresponds roughly to the physical location of the various lighting fixtures which are available to the director to light the production. In other cases, directors favor schematic diagrams and, in still other cases, straight written notation is utilized in a series of entries corresponding to a sequence of lighting arrangements.

Once having established this lighting pattern, the lighting control designer then goes to a lighting control system to input all of his lighting control directions for the production. A present-day lighting control system typically includes a microprocessor-based control console having one or more keyboards on it and one or more other control elements, such as a wheel for utilization in setting of light levels and in fading from one scene to the next. In addition, a typical control console utilizes one or more CRTs for displaying information to the operator with respect to the different lighting levels and patterns which have been set using the console.

Typically, a lighting control console controls 100 or more channels. Each channel corresponds to a different specific element of the overall lighting plan or pattern. The lighting director first assigns all of the lights which are being utilized, either singly or in combination, to each of the individual channels controlled by the console. The lights are then electrically connected to the control system by such means as a "patch" panel or an electronic patching arrangement.

At the console, the designer, utilizing the keyboard, then calls up, for example, a display of all of the channels controllable by the console. This is typically labelled a "Stage" display on the CRT. A command line also appears on the CRT and, utilizing the keyboard, the operator enters one or more channels opposite the word "CHANNEL" in the command line. For example, he enters "34 THRU 36," indicating that the next command will apply to the lights which are controlled by channels 34 through 36. Assuming he wants to bring the lights in these three channels up to half level, he then enters the notation "AT 5," indicating that these levels are to be set at 50% of their maximum intensity, the number 5 being a shorthand expression for 50% of intensity, or 0.5 on a scale of 1.0 maximum intensity.

The operator then proceeds in this fashion to record all of the operating information for achieving the desired lighting levels, patterns, cues, and lighting effects for the entire production. In doing so, he enters all levels of intensity for different lights or channels, all information for determining the combination of lights controlled by each channel, and all information for combining different channels in each sequence in the lighting pattern. He also enters cueing information, such as controlling the timing of bringing up lights in a certain area, holding them at that level for a given period of time and then reducing them to a different level or fading them out entirely as a new group of lights are faded up to their proper level.

Once this information is initially recorded, then it is recalled using the keypad by calling up the channel or "Stage" display or the cue display on the CRT, etc. and making adjustments by means of the keypad as necessary, as the staging of the show and rehearsal progresses. Working in conjunction with the director and other artistic personnel connected with the production of the show, the lighting pattern is eventually finalized for the actual presentation of the production.

As the foregoing indicates, the mechanics of developing and setting a light pattern for an entire production is a rather lengthy and time-consuming process. The setting of lighting patterns, the defining of channels, the selection of levels, the development of cues and information of this type requires a large number of keystrokes and manipulations of fader controls and the like.

BRIEF DESCRIPTION OF THE INVENTION

The present invention provides an alternative to the conventional keyboard or keypad for the selection and recall of lighting patterns. The invention provides a touch sensitive tablet with a stylus which, in conjunction with a lighting control console, can create lighting plots and dimming levels directly, without the use of the conventional keyboard or keypad. The invention is a self-contained portable unit duplicating all keyboard functions of the main console and allows the designer to call up predefined lighting groups on his diagram of the lighting pattern with the touch of a stylus.

In terms of apparatus, the present invention provides an apparatus for controlling theater, television, and film lighting which comprises a digitizer tablet and an overlay for placement on the digitizer tablet. The overlay has lighting control indicia and an open active area displayed on it, and control means are provided for operative engagement with the tablet and the overlay for selecting desired points of the indicia and active area of said overlay. Connector means are provided for interconnecting the tablet and a microprocessor-controlled lighting control system, and programming means are provided in the microprocessor for controlling the lighting control system and the digitizer tablet. Finally, data display means are operatively connected to the lighting control system to display the data input into the apparatus at the tablet or the lighting control system.

As indicated at the outset, the present invention provides a self-contained portable unit which duplicates all of the keyboard functions of a main lighting control console. Such a unit enables the lighting designer to define his lighting symbols or notation as individual instructions or sequences of lighting commands which may thereafter be recalled by the user by touching or pointing to a symbol. In a presently preferred embodiment, the control means is a stylus, and the data display means is a color monitor, a CRT. In use, the tablet may be utilized at a remote location using a remote color monitor or locally with a main console.

The overlay is provided with two distinct areas. The first area duplicates all the keyboard functions of the main console with which the digitizer tablet is associated. The second area is an open active area on which the lighting designer places a sheet of paper on which he has drawn or entered his plot or layout of the lighting pattern. Typically, this sheet contains a number of different symbols corresponding to certain areas on the stage, sidelights, footlights, rear lights (for illuminating the cyclorama) and other special lighting fixtures. The sheet is secured to the open active area by tape or the like in preparation for initially programming the lighting pattern into the apparatus and for later use in setting levels and in modifying the pattern or levels. In a preferred embodiment of the present invention, the control means is a stylus which is interconnected with the graphics tablet.

In the process of defining each symbol, the operator touches the point of the stylus to a particular symbol on the lighting pattern. This sensitizes a particular point on the digitizer tablet, and the operator, utilizing the tablet, then defines what this point is, for example, "CHANNELS 34 THRU 36"; or utilizing the keyboard on the main console, defines the channel by keying into the command line "34 THRU 36." The operator then permanently records this symbol definition in the memory of the console by operating another key, such as an "Enter" key. In this fashion, the operator proceeds to define each of the symbols on his lighting pattern and has complete freedom in deciding whether the symbols which he has used are to represent a channel, a specific cue, a specific lighting effect, or a combination of channels, cues, effects, etc. Thereafter, when the lighting commands are recalled by pointing or touching the stylus to the symbol on the overlay, the sequences of lighting commands are displayed on the CRT.

BRIEF DESCRIPTION OF THE DRAWINGS

These and other aspects of the invention will be better understood by reference to the figures of the drawing, wherein

FIG. 5 is another lighting pattern using a third type of notation;

DESCRIPTION OF A SPECIFIC EMBODIMENT

Figure 1:
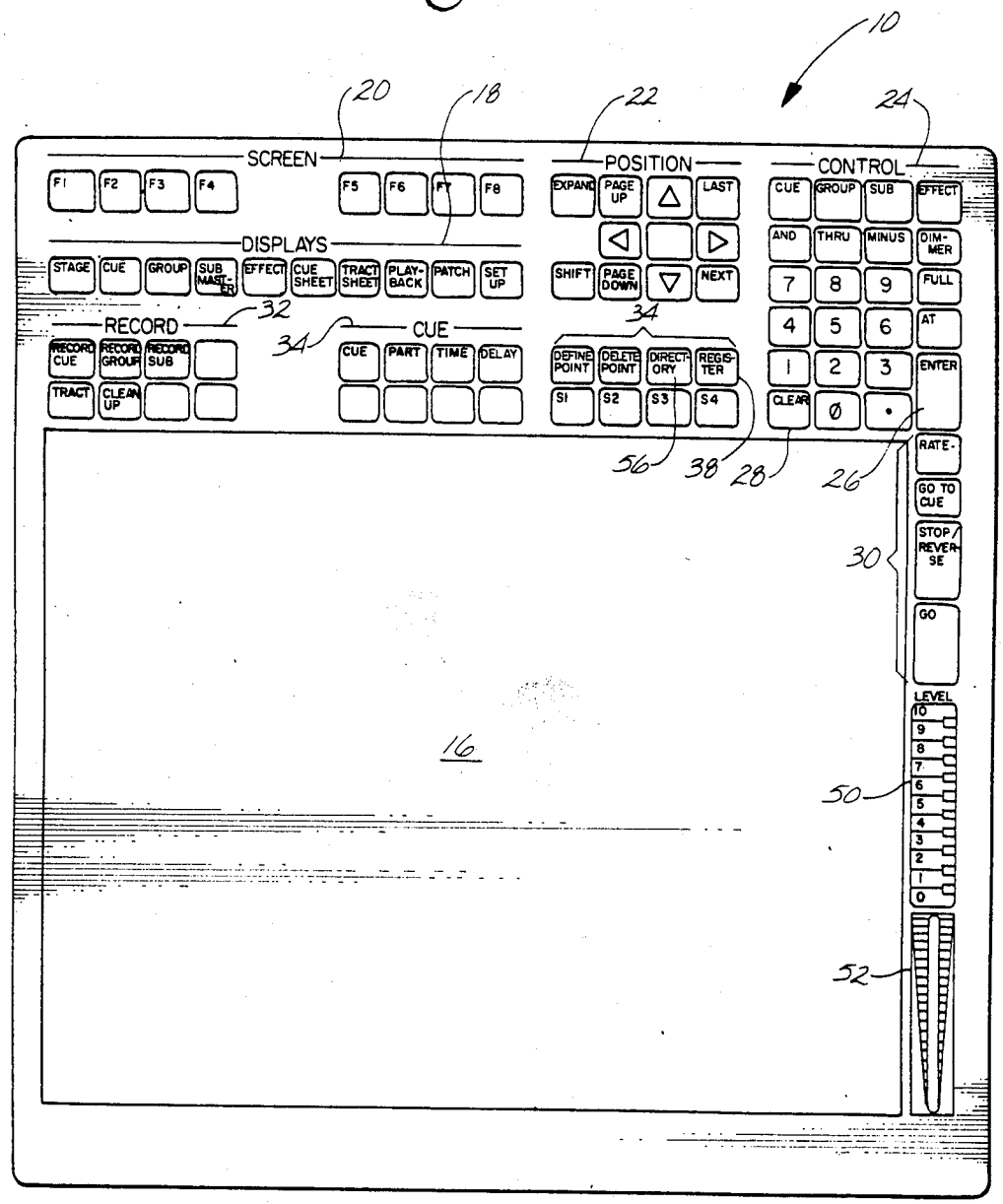
FIG. 1 is a plan view of an overlay according to the present invention.
Figure 2:
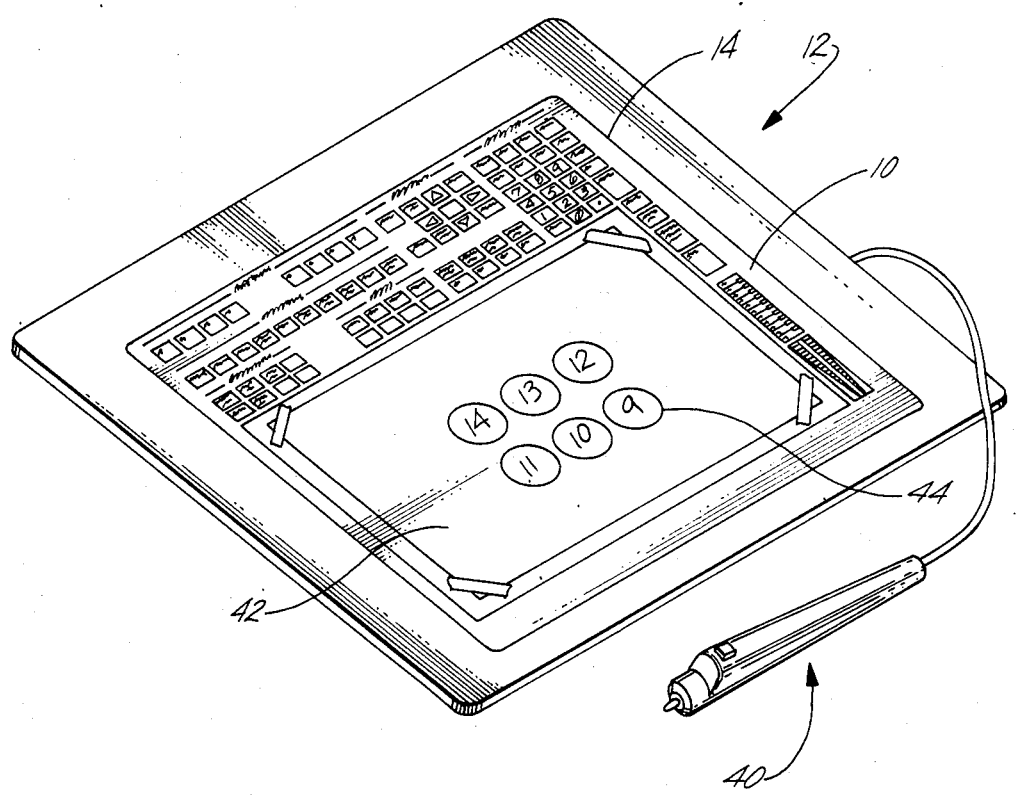
FIG. 2 is a perspective view of the digitizer tablet with the overlay applied thereon, including the stylus.

An overlay 10 according to the present invention is shown in FIG. 1. As shown therein, the top and right side areas of overlay 10 simulate the various portions of the keyboard on the main console with which the digitizer tablet of the present invention is utilized. A digitizer tablet 12 according to the present invention is shown in FIG. 2. Tablet 12 is also sometimes referred to as a graphics tablet. The overlay is positioned within a detente 14 countersunk into the face of tablet 12.

Referring again to FIG. 1, overlay 10 includes an active open area 16 which can be chosen to be of a number of different sizes, but is typically chosen to have dimensions of 8½ by 11 inches. It is in this area that the lighting designer places his drawings or layout of the lighting pattern which he has designed. In the preferred embodiment, overlay 10 is fabricated of a flexible polycarbonate material in which different keyboard portions of the overlay are color-coded corresponding to the different keyboard functions and features available.

In the overlay in FIG. 1, the various groupings and key indicia shown in FIG. 1 are indicia which are silk-screened onto the overlay and depict corresponding keys that appear on the main console, although not in the same relational position. The digitizer tablet and lighting control console have been preprogrammed by the insertion of programming instructions in the microprocessor so that when any one of the keys are touched or the simulated keys are touched by the stylus, the proper display corresponding to that key appears on the screen or the proper function is communicated to the lighting control apparatus. Thus, when one of the "keys" in the "Displays" grouping 18 is touched with the stylus, a system display corresponding to that key is immediately called up on the CRT screen, e.g., the "Stage" display.

Referring to FIG. 1, the series of keys symbolized by the "Displays" grouping 18 are the keys for calling up various system displays on the CRT. The keys symbolized under the "Screen" grouping 20 are function keys which correspond to up to eight different functions which are available in each of the ten system displays. The functions to which the function keys correspond change with each of the displays from the selection of system displays. When, for example, F4 is touched by the point of the stylus after the "Cue" system display has been called up on the screen, the function of the "Cue" system display corresponding to function 4 is thereby selected. The grouping of keys designated by the "Position" grouping 22 are keys for moving a cursor up, down, left or right in various displays, for paging up or down in a given display and for accessing the previous or next item in a display.

The grouping of keys designated by the "Control" grouping 24 are control keys which are essentially an expanded numeric keypad utilized to enter numeric and word information into the console in the process of creating items or lists of lighting pattern information such as a channel list. The indicia marked "Enter" 26 in FIG. 2 is utilized to terminate commands, and the "Clear" indicia 28 is utilized to delete previous entries. The group of indicia to the right-hand side of the overlay which are labeled "Rate," "Go To Cue," "Stop/Reverse," and "Go" are the keys which are referred to as the "playback" keys and typically are utilized during the actual staging of the production. For example, touching the "Go" key with the stylus causes the lighting control equipment and CRT display to advance to the next cue.

The indicia grouping designated by the "Record" grouping 32 are keys utilized for recording levels from the "Stage" display into cues or other lighting pattern information, such as certain lighting pattern combinations which are designated as "Groups" and "Sub-masters."

The grouping with keys designated by the "Cue" grouping 34 is a cluster of keys utilized for writing and editing cues, cue parts, cue timing and delays in the intervals between cues. The final grouping of keys 34 include keys with specific relation to the digitizer tablet and are utilized during the definitional process wherein the various symbols on the designer's plan are defined and input into the memory of the console. Once all the symbols have been defined, the definitions of all symbols can be called upon the CRT screen by touching the stylus to the "Directory" key 36. The "Register" key 38 is used to register the exact position of a lighting plan on area 16 and when a lighting plan which has been utilized to define symbols has been removed and thereafter replaced in open active area 16. In this latter instance, this function is utilized to compensate for the possibility that the lighting plan sheet may not be placed in exactly the same position the second time it is repositioned into the open active area 16. In effect, the registration or reregistration process tells the tablet to shift all points which have been sensitized to compensate for the new placement of the plan.

The keys designated S1 through S4 in the grouping 34 are spare keys which are available for dedication to other specific functions as they may be required or desired by the operator for lighting design.

A scale 50 is provided below grouping 30. This scale is utilized for setting levels of the lights in any channel or grouping. By touching one of the larger spaces in which the numerals 0-10 appear with the point of the stylus, a particular lighting level from 0% to 100% (Full) is selected. By touching the smaller squares to the right of the larger squares, a level halfway between the levels designated by the numerals is selected, for example, 35% or 45%. The level-setting scale 50 provides a shorthand way of entering information. The apparatus is programmed so that touching the square designated 5 is the same as hitting the keys on the numeric keypad designated "AT 5, ENTER."

A slot 52 is also provided in the overlay in the lower right-hand corner. This slot simulates the raise/lower action of a wheel which is used to function as a fader.

The digitizer tablet 12 and stylus 40 are shown in an isometric view in FIG. 2 with overlay 10 in place in the detente 14 provided in the tablet. A digitizer or graphics tablet such as tablet 12 is a device which is available from a number of manufacturers for utilization with graphics workstations. Examples of tablets suitable for use with the present invention are the MM Series Digitizers manufactured by Summagraphics Corporation, Fairfield, Conn., and, in particular, Model M1201-RS together with stylus MMSTY1. A highly simplified lighting plan 42 is shown in place in the active area 16. This lighting plan utilizes circles 44 as symbols in this notation to designate certain lighting areas on the stage to be illuminated. These circles correspond to the circles shown in the typical lighting plan shown in FIG. 3. For purposes of simplification, the other details of the lighting plan shown in FIG. 3 have not been carried over into the lighting plan shown on the graphics tablet of FIG. 2.

In defining each of the circles 44 for the lighting control system, the lighting designer goes through the following steps: (1) The stylus is touched to the key indicia on the overlay labeled "Define Point"; (2) the stylus is then touched to the desired circle 44, then utilizing either the tablet or the keyboard on the main console, the designer enters the definition information, defining what the circle symbol 44 means; (3) he enters, utilizing the "Control" indicia 24 or the keypad on the console, the following entry: "34 THRU 36"; (4) he then touches the "Enter" indicia 26 on the keypad or the tablet to record this definition in the system memory.

The definition of the other symbols in the lighting plan processes accordingly.

Figure 3:
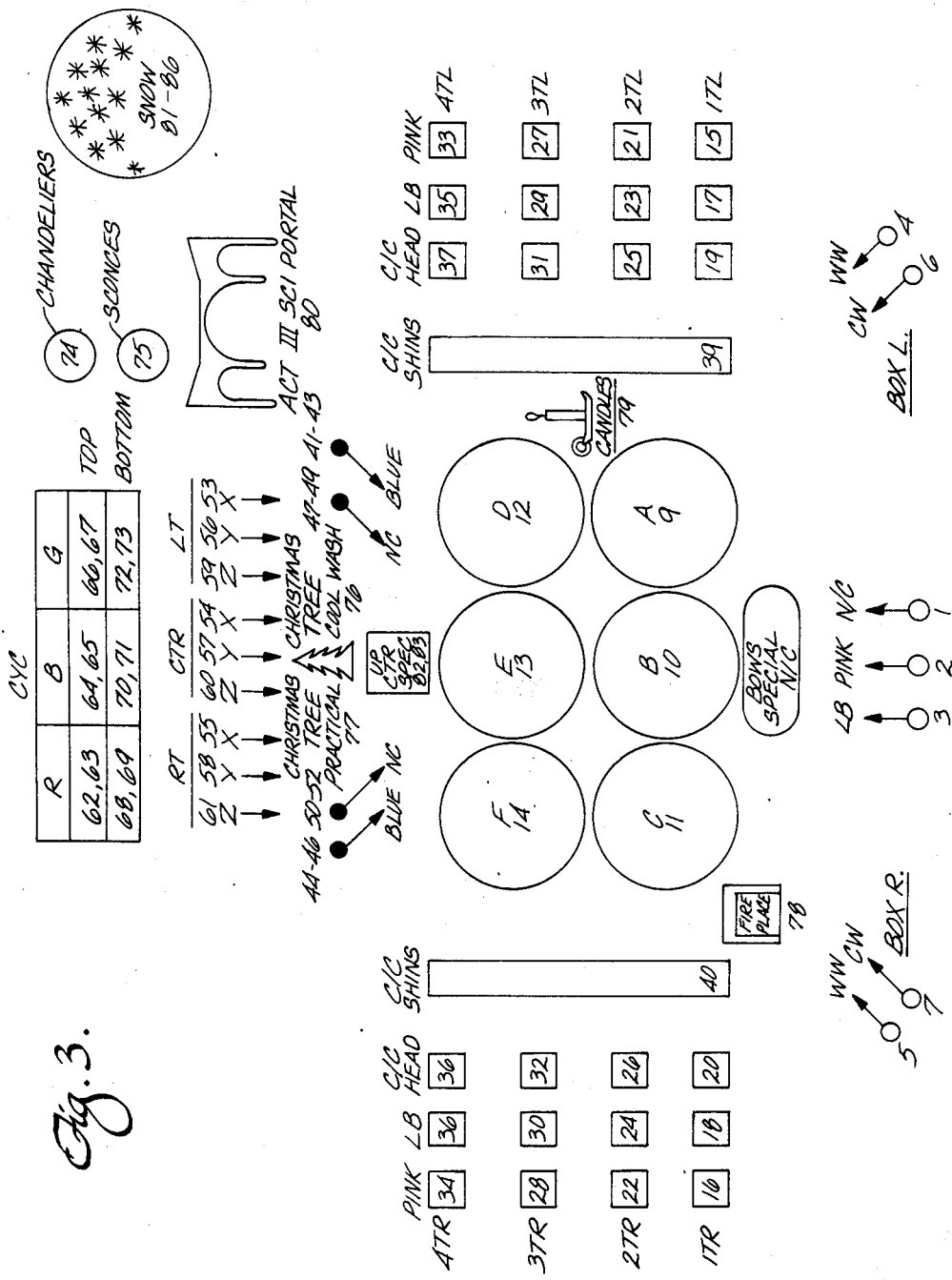
FIG. 3 is a representative sample of one type of lighting pattern as prepared by a lighting designer.
Figure 4:
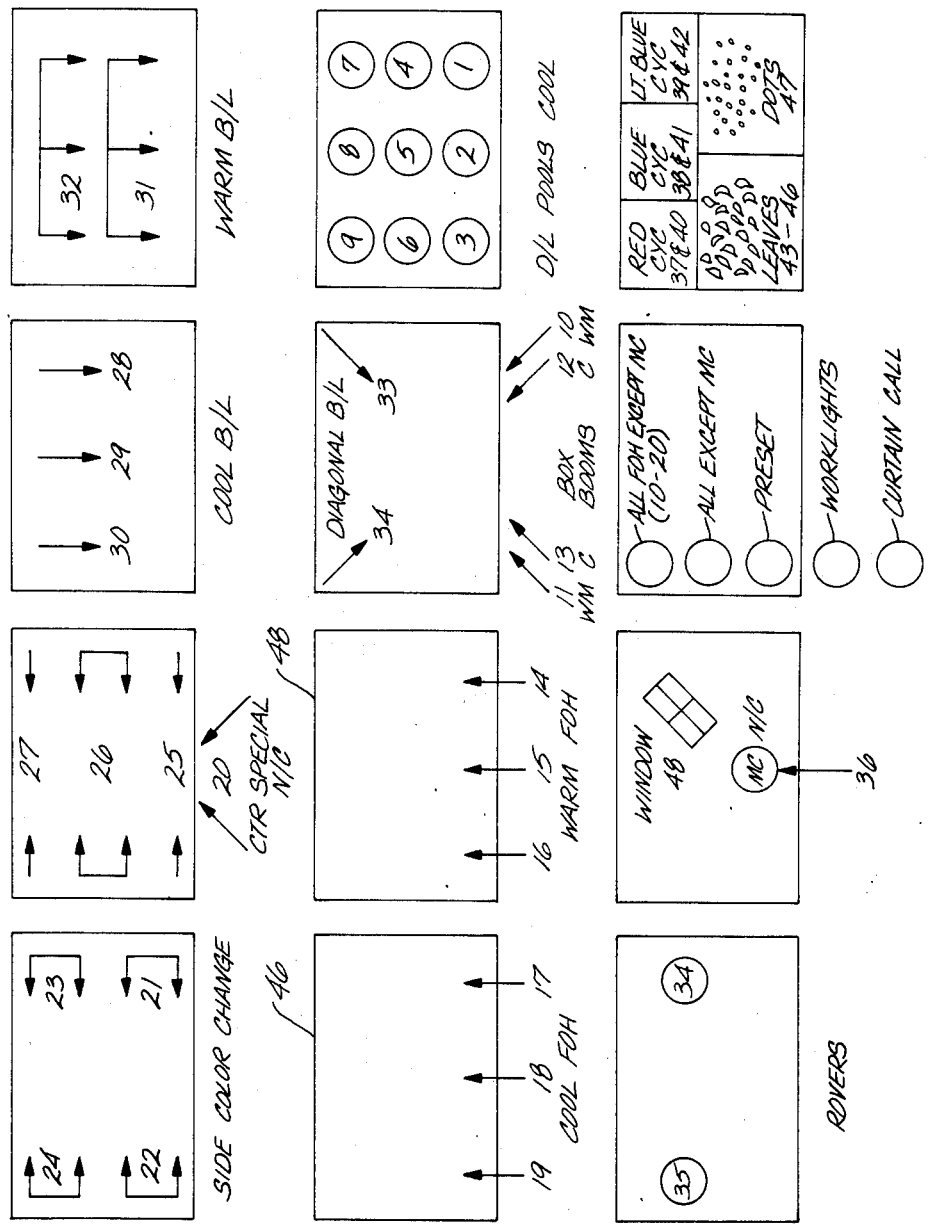
FIG. 4 is a diagram of another lighting pattern using a different style notation.

Various types of lighting plans are shown in FIGS. 3, 4, and 5. The lighting plans of these figures illustrate the different forms of the notation which are used by lighting designers or lighting directors in developing an overall plan for the lighting of a production to which they are assigned. In FIG. 3, the lighting designer uses large circles to denote areas on a stage which are to be illuminated. As can be seen from FIG. 3, each individual symbol utilized in the lighting design has been assigned its own individual number. These numbers correspond to the channels in the control console which control the lighting levels of the lights to which each symbol corresponds or identifies. For example, lighting area A is controlled by channel 9 and lighting area E is controlled by channel 13. Truss-mounted lights on the left are identified by the notation "1TL," "2TL," "3TL," "4TL," and, for example, the pink lights in the group of lights mounted on the first truss left ("1TL") are controlled by channel 15. Similarly, the lighting for the backdrop, or cyclorama, at the rear of the stage, which is designated "CYC" in FIG. 3 is controlled by channels 62 through 73. In that grouping, the red lights (R) are controlled by channels 62, 63, 68, and 69; the blue lights (B) are controlled by channels 64, 65, 70, and 71; and the green lights (G) are controlled by channels 66, 67, 72, and 73.

Each lighting designer has his own particular preference in terms of symbolism which he uses when designing a lighting layout. In utilizing a lighting pattern or plan of FIG. 3, the designer places the sheet containing all of the symbols shown on FIG. 3 on the open active 16 of the digitizer tablet 12. He then proceeds to define each one of the symbols by touching the stylus to varous points on the tablet. For example, to define that the circle designating area "A" is controlled by channel 9, the lighting designer, utilizing the stylus, touches in sequence the "Define point" key, area "A," the key designated "9" on the control keypad 24, and the "Enter" key 26 or goes through the same keying motions with the actual keys on the main console.

The designer then proceeds in similar fashion to define each and every one of the symbols on the lighting pattern in the same manner by utilizing the tablet or the keyboard on the main console to key-in the definitional information which will define what channels are associated with each and every symbol on the plan. Thereafter, the designer can recall any given channel to the command line on the CRT display by simply touching the stylus within the symbol which he has previously defined, such as area "A" (channel 9); little square 15, the pink truss lights on the first truss left (channel 15), or the rectangle for the top red lights in the cyclorama (channels 62, 63). At such time as the symbol is touched and the channel recalled, the designer can either change, add to, or subtract from the definition of the symbol previously entered into the apparatus. He can likewise set the levels of the lighting in that channel at this time or at a later time by recalling the definition for this symbol to the screen. Likewise, he can define his symbol as any other kind of lighting instruction, such as a cueing pattern or a string of instructions.

In setting levels, the designer utilizes scale 50 or the numeric keypad on the control console or the indicia keys on the digitizer tablet. The quickest method is to use scale 50. By touching the square in which the number 5, for example, is located, this is the equivalent of keying in the notation "AT 5, ENTER." Thus, the designer can set levels very quickly using the level-setting scale instead of having to go through a sequence of keystrokes.

In constrast to the pattern of FIG. 3, a more schematic approach to a lighting pattern is shown in FIG. 4. Examining, for example, the rectangles designated 46 and 48, these rectangles are used to symbolize the lights at the front of house ("FOH") which provide a "cool" lighting effect and a "warm" lighting effect, respectively. The lights in the "cool FOH" grouping are controlled by channels 17, 18, and 19. Similarly, the lights in the "warm FOH" grouping are controlled by channels 14, 15, and 16. To define this symbol, the designer goes through the same steps as outlined before by touching in sequence the "Define Point" key, the space within the box designated 46, and then entering the notation through the console or the overlay "17 THRU 19." As in FIG. 3, each specific symbol of interest to the lighting designer is assigned a specific channel number to identify the channel which controls the lights associated with that symbol.

A third type of notational format is shown in FIG. 5. The numbers in the left-hand column designate channels, and the notation to the right of the numbers designates specific lights which are controlled by that channel. For example, channel 1 controls the fifth light in the second box boom on the left, and the first light in the second box boom on the right. By touching the box in which the notation "2BBL5, 2BBR1" is located and then keying in the number "1" to identify channel 1, this symbol is defined in the equipment of the present invention. Thereafter, by touching the stylus to the rectangle in which the "2BBL5, 2BBR1" notation appears, this channel 1 can be recalled to the screen for redefinition or for level of selection.

Figure 6:
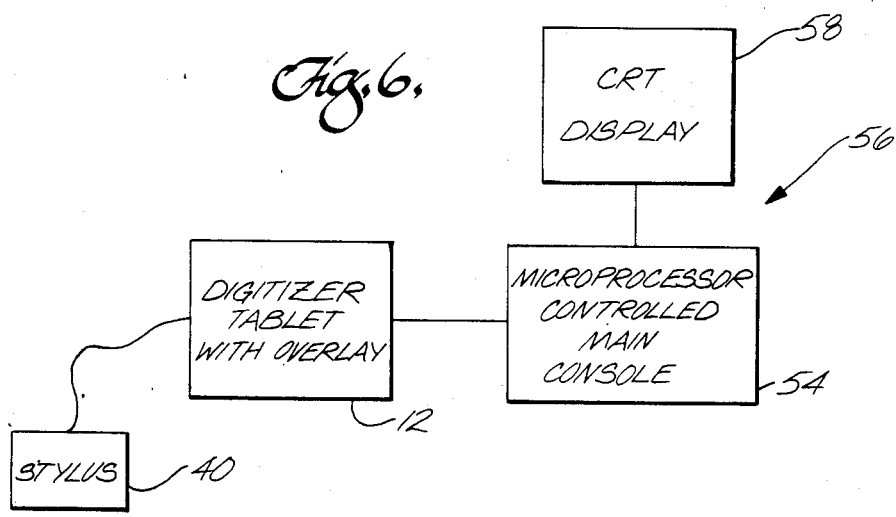
FIG. 6 is a block diagram of the apparatus according to the present invention.

A block diagram of the major components of the lighting control system 56 according to the present invention is shown in FIG. 6. As shown therein, the stylus 40 is connected to digitizer tablet 12. The tablet 12 is in turn connected to a microprocessor-controlled main console 54 which includes the keyboard and controls heretofor described and, in addition, includes a disk drive for use with diskettes to provide long-term library storage of cue and patch data. The next element in the system is a CRT display (typically a local or remote color monitor) 58 for displaying the various system displays such as the "Stage" display.

Figure 7:
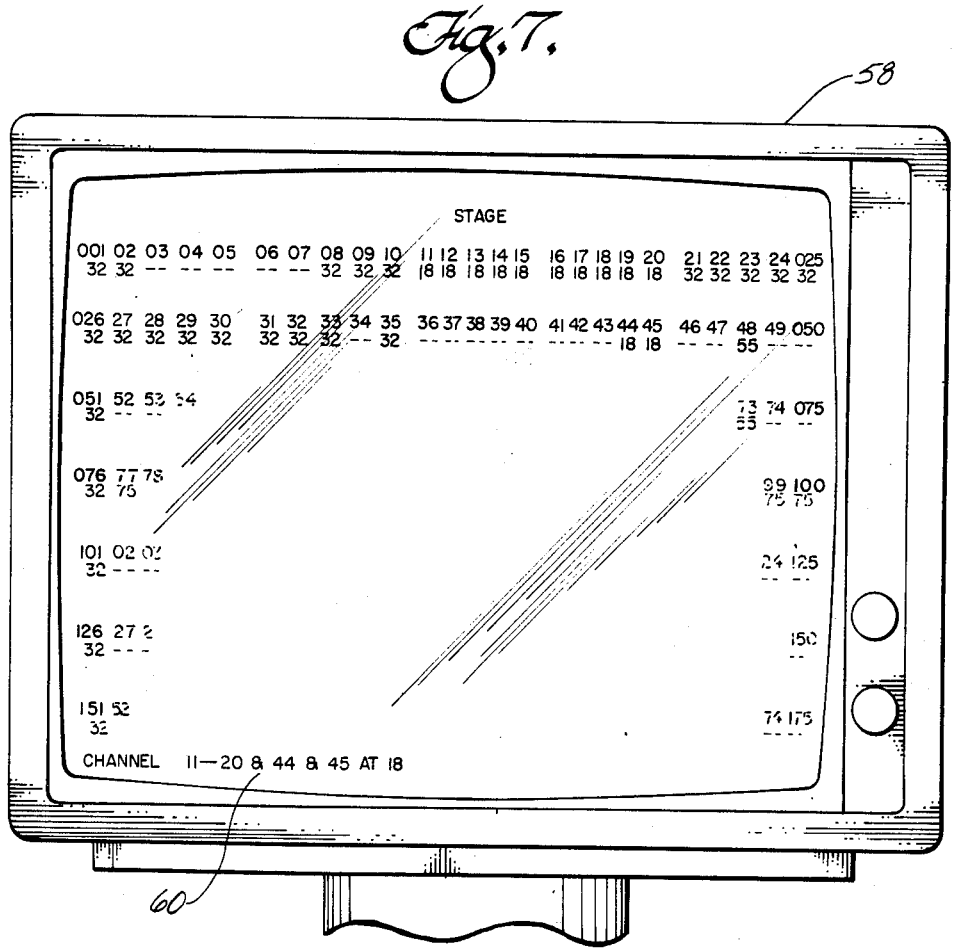
FIG. 7 is a typical display of channel information and settings on a CRT utilized with the present invention.

A typical "Stage" display is shown on the illustration of the CRT 58 shown in FIG. 7. As shown therein, the channel and level information is depicted in each of the double lines of information on the screen. The first double line shows the light levels in channels 1 through 25. As shown therein, the light levels in channels 1 through 10 and 21 through 25 is 32%, and in channels 11 through 20 the level is 18%. The command line 60 appears at the bottom of the CRT screen display. As indicated, the operator has just set the levels in channels 11 through 20 and 44, 45 at 18%.

What is claim is:

1. Apparatus for controlling theater, television and film lighting comprising:
    a digitizer tablet;
    an overlay for placement on the digitizer tablet, said overlay having lighting control indicia and an open active area displayed thereon; said open active area being of a predetermined size for receiving a graphic illustration containing symbols representing a lighting control plan for an area of a theater, television, or film stage area to be subjected to controlled lighting;
    control means for operative engagement with the tablet for selecting desired points of the indicia and active area of said overlay;
    connector means for interconnecting the tablet and a microprocessor-controlled lighting system;
    programming means in the microprocessor for controlling the lighting control system and digitizer tablet; and
    data display means operatively connected to the lighting control system to display the data input into the apparatus at the tablet or the lighting control system.

2. An apparatus according to claim 1 wherein said indicia simulate keys on a keyboard.

3. An apparatus according to claim 2 wherein said lighting control system includes a console having a keyboard and at least one level-setting control device.

4. An apparatus according to claim 3 wherein said indicia on said overlay simulate the keyboard of said lighting control console.

5. An apparatus according to claim 4 wherein said overlay includes a level-setting scale.

6. An apparatus according to claim 5 wherein said overlay includes a slot simulating said level-setting control device.

7. In an apparatus for controlling theater lighting having a microprocessor-controlled lighting system, programming in the microprocessor for controlling the lighting control system and data display means operatively connected to the lighting control system, the improvement comprising:
- a digitizer tablet operatively connected to the lighting control system;
- an overlay for placement on the digitizer tablet, said overlay having lighting control indicia displayed thereon and an open active area of a predetermined size for receiving a graphic illustration containing symbols representing a lighting control plan for an area of a theater, television, or film stage area to be subjected to controlled lighting; and
- control means connected to the tablet for operatively selecting desired indicia for an overlay.

8. Apparatus for controlling theater, television and film lighting comprising:
- a digitizer tablet;
- a microprocessor-controlled lighting control console having a keyboard and at least one level-setting control device;
- an overlay for placement on the digitizer tablet, said overlay having lighting control indicia and an open active area display thereon, said indicia simulating the keyboard of said lighting control console, said overlay including a level-setting scale and a slot simulating said level-setting control device;
- said open active area of the overlay being of a predetermined size for receiving a graphic illustration containing symbols representing a lighting control plan for an area of a theater, television, or film stage area to be subjected to controlled lighting;
- control means for operative engagement with the tablet for selecting desired points of the indicia and active area of said overlay;
- connector means for interconnecting the tablet and the console;
- programming means in the microprocessor for controlling the lighting control console and digitizer tablet; and
- data display means operatively connected to the lighting control console to display the data input into the apparatus at the tablet or the lighting control console.

* * * * *